Figure 1:
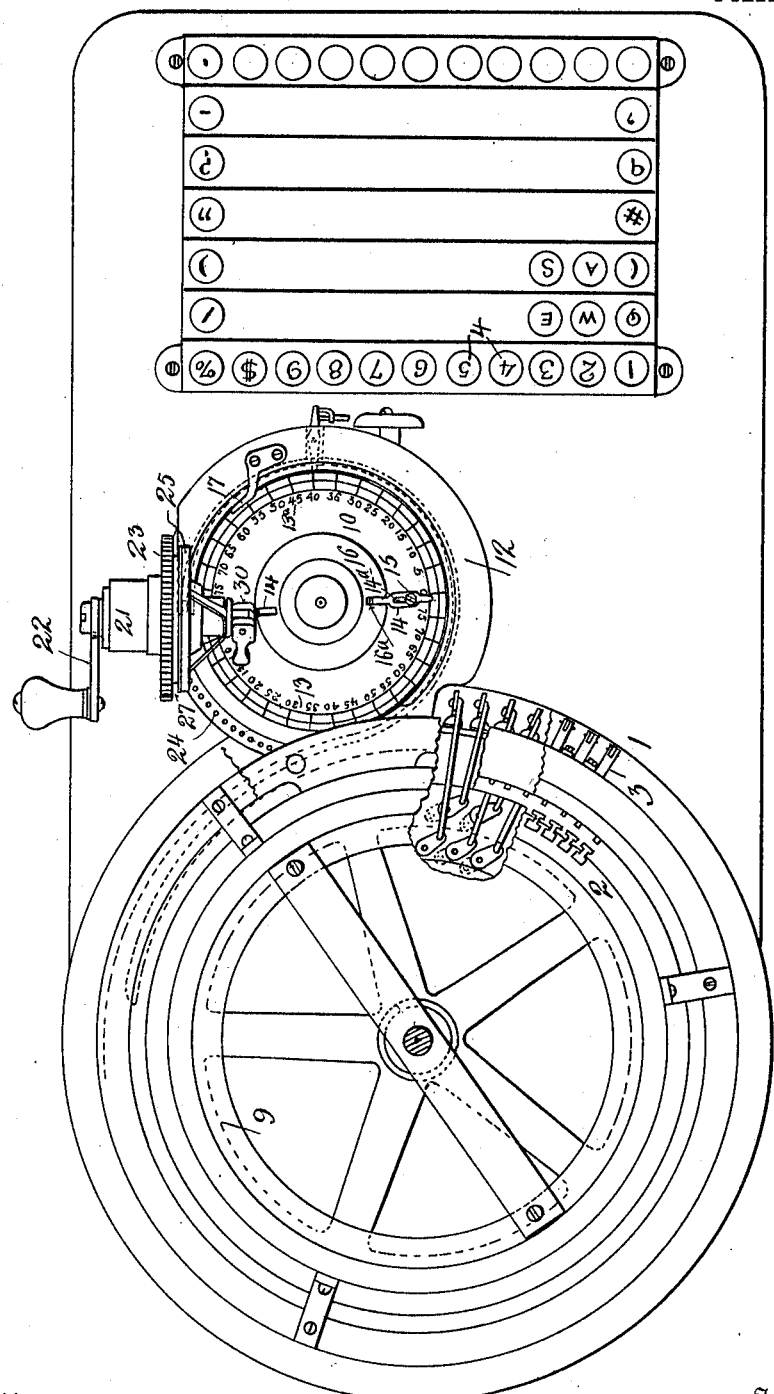

J. STEEL.
TYPE ASSEMBLING DEVICE.
APPLICATION FILED JAN. 4, 1909.

1,004,601.

Patented Oct. 3, 1911.
2 SHEETS—SHEET 1.

Witnesses:

Inventor
James Steel.
By his Attorney
T. F. Bourne

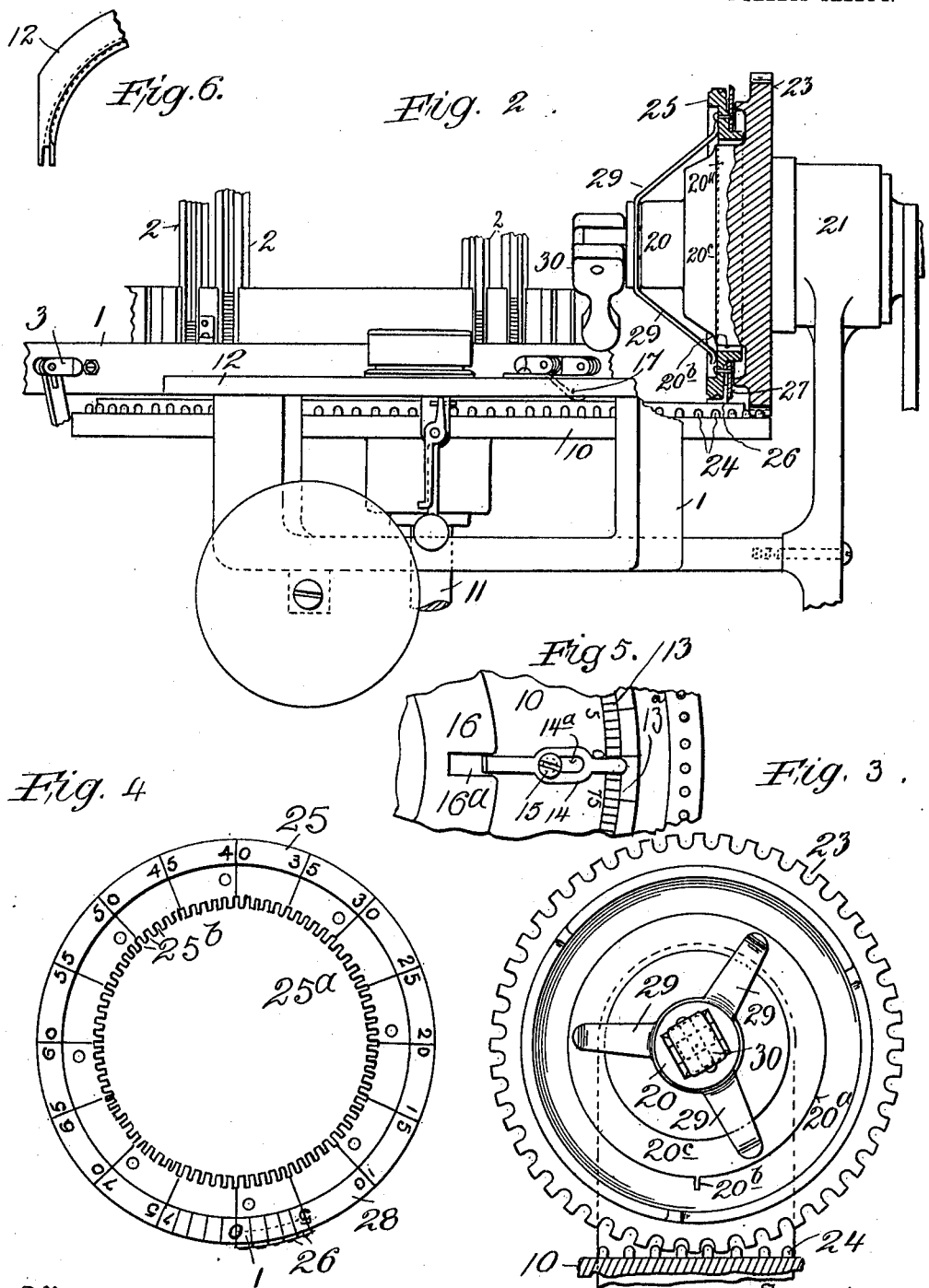

UNITED STATES PATENT OFFICE.

JAMES STEEL, OF LITTLE FALLS, NEW JERSEY.

TYPE-ASSEMBLING DEVICE.

1,004,601.   Specification of Letters Patent.   Patented Oct. 3, 1911.

Application filed January 4, 1909. Serial No. 470,676.

*To all whom it may concern:*

Be it known that I, JAMES STEEL, a citizen of the United States, and resident of Little Falls, in the county of Passaic and State of New Jersey, have invented certain new and useful Improvements in Type-Assembling Devices, of which the following is a specification.

My invention relates to improvements in means for assembling individual type upon disks or annular galleys, and is adapted for use in connection with the class of type setting machines set forth in United States Letters Patent No. 870,699, granted Nov. 12, 1907, and No. 880,341, granted Feb. 25th, 1908, to Elah Terrell, wherein the type are selected by the manipulation of keys and placed upon a rotative table from which the type are removed for use.

It is important that the type be collected accurately upon the receiving disk or galley to the end that such disks or galleys may be placed upon a shaft for use in printing in such relation that the margins of the various printed lines, and the indentations for paragraphing or for tabulating, may be accurately and expeditiously brought into proper relative positions. To these ends I provide the rotatable type-receiving table with a suitable scale correlated with a type pusher on the table and with a type retarding spring or finger located in the line of travel of the type upon and with the table, whereby any number of type placed upon the table will be assembled thereon in proper position in accordance with said scale, and in connection with said table I provide a hub or shaft geared to the table in positive predetermined relation with respect to the scale of the table, which hub or shaft is provided with a projection or key in such relation to the zero or other indication of the scale that when a type disk or galley is placed upon the hub or shaft in operative connection with such key the type will be picked up from the table by said disk or galley in definite relation to said scale. Said disk or galley is provided with a scale corresponding to the scale on the table, and also is provided with notches corresponding to its scale divisions or indications, all whereby the disk or galley may be accurately placed upon said hub or shaft in connection with its key in definite relation to the number of type deposited upon the table, and according to whether the line of type picked up by the disk or galley is to start at the margin or for indentation or tabulation on the paper to be printed from such type.

My invention also comprises the novel details of improvement and combinations of parts that will be more fully hereinafter set forth and then pointed out in the claims.

Reference is to be had to the accompanying drawings forming part hereof, wherein, Figure 1 is a plan view, partly broken, of a type setting machine embodying my invention; Fig. 2 is a front view of a portion of the machine, part being in section; Fig. 3 is a face view, partly in section, illustrating the disk or galley-receiving hub or shaft and the gearing; Fig. 4 is a face view of one of the type receiving disks or galleys; Fig. 5 is a detail of the type table, and Fig. 6 is a detail of the type guide.

Similar numerals of reference indicate corresponding parts in the several views.

The numeral 1 indicates, generally, a portion of a type setting machine, such as set forth in the patents before mentioned, wherein the L-shaped type are maintained in columns in type tubes 2 and are delivered therefrom as required by pushers or plungers 3 operated by keys 4, and at 9 is a revolving type distributing disk that operates substantially as set forth in said patents.

At 10 is a rotative type receiving table supported in suitable manner, as upon a shaft 11, and located in position to receive type from the type selecting and delivering devices, which type are guided around upon said table by the annular guide 12 above said table. The table 10 is provided upon its top surface with a scale 13 located within the inner surface of guide 12, so as to be readily seen from above, which scale may be engraved upon the table, and upon said table, adjacent part of the scale, as at the zero of the scale, is located a type pusher or finger 14, which may be made radially adjustable, as by a slot 14$^a$ in said pusher receiving a screw 15 entering a threaded hole in table 10, to prevent type upon the table from passing back of the adjacent zero mark as the table rotates, a disk 16 upon the table provided with slot 16$^a$ receiving the adjacent end of the pusher 14 for permitting adjustment of said pusher while holding the same in proper position. There may be two of such scales 13, 13$^a$ upon table 10, each scale comprising any desired number of divisions or indications, in the example illustrated each scale comprising 80 spaces, said scales adjoining and following each other in line, there being two type pushers or fingers 14 oppositely disposed upon table 10, each back of the zero point of the corresponding scale, or adjacent the lowest numeral of one scale and the highest numeral of the adjacent scale respectively. Thus, along one edge of table 10 between two type pushers or fingers 14 is a scale 13 and along the other edge of table 10 in corresponding relation between type pushers or fingers 14 is another scale $13^a$, each scale being shown provided with 80 spaces numbered accordingly, the zero indication corresponding to the numeral 80 of one scale or the numeral 1 of the following scale, as may be desired. With one of the fingers 14 projected forwardly across the circle of the scales, and the table set with such finger behind the point of delivery of type upon the table, the type may collect upon table 10 forwardly of such finger, so that when table 10 is rotated the type thereon and said finger 14 will be carried around with the table. The other type pusher or finger 14 being maintained retracted from the circle of the scales does not interfere with the type deposited upon table 10.

At 17 is a spring stop or finger shown secured upon guide 12 and extending over table 10 in the path of travel of the type thereon to act as a temporary barrier for the type.

At 20 is a shaft mounted in suitable bearings 21 carried by the main frame and shown provided with a handle 22 and with a gear 23 that meshes with a gear 24 connected with table 10 for rotating the latter. The gear 24 is shown for convenience in the form of pins to engage the teeth of gear 23, the latter gear being located outwardly beyond the line of type upon table 10. In the arrangement shown the ratio of the gearing is two to one whereby one revolution of gear 23 will cause one-half revolution of table 10.

At 25 is a type receiving disk or galley, shown substantially in the form of a ring, whose interior opening $25^a$ is adapted to fit upon a suitable hub $20^a$ of shaft 20, said disk or galley being provided with means for retaining L-shaped type 26 upon its periphery. The type may be held upon the disk or galley by means of a ring-like plate 27 secured by rivets to one face of the disk, providing a space for one leg of the type to fit between disk 25 and plate 27. (See Fig. 2). The periphery of disk 25 corresponds in length to the length of a scale 13, or $13^a$, thus being one-half the length of the two scales in the circle, and the face of the disk is provided with a scale 28 corresponding to scale 13, $13^a$. The inner edge of disk 25 is provided with notches or recesses $25^b$ corresponding with the divisions of its scale and adapted to receive the key or projection $20^b$ of hub $20^a$ for causing the disk to revolve with shaft 20 and table 10. The position of key or projection $20^b$ with respect to scale 13 or $13^a$ is such that when the zero point of the scale is in a definite position respecting the axis of disk 25 the key $20^b$ will bear a definite relation thereto, as, for instance, when the key $20^b$ is in the position shown in Fig. 3, then the zero point of scale 13 will be directly beneath such key, as represented in Fig. 1, as table 10 will then have rotated so as to bring the scale and key into such correlation. Disk 25 is detachably held upon hub $20^a$ by suitable means, for which purpose I have shown spring arms 29 slidably connected with shaft 20 and operated by a handle 30 pivotally connected with said shaft, whereby when the handle is in the position shown in Figs. 1 and 2 the spring arms 29 will be projected against the disk 25 to hold the same in position upon the hub, and when handle 30 is swung outwardly in line with shaft 20 the spring arms 29, by sliding up the beveled part $20^c$ of the hub (see Fig. 3) will be drawn within the line of opening $25^a$ to permit the insertion and removal of disk 25.

When it is desired to select the type and assemble them upon a disk or galley 25, the table 10 will be set in such position that its finger 14 will be set behind the delivery point of the type from the type selecting devices, such finger being projected across the scale, and then if it is desired to place the type upon the disk or galley to print upon paper at the margin of a line, the disk will be set upon hub $20^a$ in such position that the notch on the zero of the scale of the disk will receive the key $20^b$, and when the desired number of type have been disposed in line upon table 10 by the type selecting devices handle 22 will be revolved, whereupon pusher 14 which was projected forwardly will push the type until the first type of the row of type engages the stop 17 where it is temporarily retained, and the rotation of the table will cause the type thereon to aline side by side, and thereupon by stopping the rotation of the table and inspecting the scale the exact number of type in the row can be determined at a glance, and then by continued rotation of handle 22 the type so assembled side by side upon the table will be brought in proper position under the disk 25 and picked up thereon as the disk revolves, the type thereby being disposed upon the disk in proper order from zero with respect to the scale thereon. When the type are all upon the disk the latter will be removed from its hub and placed upon a suitable shaft having a key. Several disks may be assembled upon such shaft side by side for printing as in the manner of a cylinder. If it is desired to produce an indented line of printing, or for tabulation, the operator will observe the number of type indicated by scale 13 or 13ª when the type are pushed against stop 17, and then by determining the desired indentation for a line of type he will adjust disk 25 to hub 20ª by calculating from the scale on disk 25 the indentation required, as, for instance, 5 notches and will place the notch 25ᵇ corresponding to such fifth notch from zero upon key 20ᵇ, whereupon as the type on table 10 are presented under disk 25 they will be applied to the latter commencing at notch 5 of its scale. Then when disk 25 is placed upon the receiving shaft with the notch 25ᵇ of the scale receiving the key of such shaft the type on the disk will be in position five notches or divisions to one side of the margin line for indentation of a line, and so on for any desired indentation or tabulation. On the other hand, all disks 25 may be set upon hub 20ª with the zero notch of the disk receiving the key 20ᵇ, and the operator will first note on scale 13 or 13ª the number of type selected after such type have been arrested by stop 17, and then bearing in mind such number of type picked up on disk 25 the operator will place notch 25ᵇ of the latter upon the key of the receiving shaft in such position as to produce a marginal printing or indentation for the work to be printed.

I do not claim herein broadly the particular construction of type selecting devices, nor the arrangement of the type receiving table 10 and its gearing, nor its stop 17, nor the means for removably holding the type disk or galley upon the hub.

Having now described my invention what I do claim is:—

1. The combination of a rotative type receiving table provided with a scale, a type pusher associated with said scale, means for placing type upon said table, means for assembling the type upon the table in definite relation to the scale, a shaft provided with means to retain a type disk or galley, disk positioning means upon the shaft in definite relation to a division of said scale, and gearing for operating the table by the shaft in definite relation to the scale and the disk positioning means, said disk being provided with means for correlating a desired point of its periphery with a definite division of the scale on the table.

2. The combination of a type receiving table provided with a scale, means to apply type upon the table, means to assemble type upon the table in definite relation to the scale, a shaft provided with a key in definite relation to said scale, gearing for operating the table by said shaft to maintain the scale and key in definite relation, and means for supporting a type receiving disk or galley in connection with said shaft, said disk or galley having means for co-action with said key for holding the disk or galley in definite predetermined relation to the scale of the table.

3. The combination of a type receiving table provided with a scale, means to apply type upon said table, means to assemble type upon the table in definite relation to the scale, a shaft provided with a key in definite relation to a division of the scale, gearing connecting the shaft with the table for operating the latter in definite relation to the key of the shaft, means to detachably support a type disk or galley upon said shaft, said type disk or galley having a scale corresponding to the scale on the table and being provided with means for maintaining the disk upon the shaft in definite relation to the scale of the table.

4. The combination of a table provided with a scale, means to apply type upon the table, means to assemble type upon the table in definite relation to the scale, a shaft provided with a key, gearing connecting the shaft with the table in definite relation to the scale, a type disk or galley provided with a scale and interior notches corresponding to the divisions of the scale, adapted to receive said key, and means for detachably connecting the disk or galley with the shaft.

5. The combination of a table provided with a scale, a pusher upon the table in definite relation to a division of the scale, means to supply type upon the table, a stop in the path of the line of type whereby the pusher and the stop assemble the type upon the table in definite relation to the scale, a shaft provided with a key, gearing for operating the table by the shaft and for maintaining the key in definite relation to the zero of the scale, a type disk or galley having a scale and provided with interior notches adapted to receive said key, and means for detachably connecting the disk or galley with the shaft.

Signed at New York city, in the county of New York and State of New York, this 29th day of December, A. D. 1908.

JAMES STEEL.

Witnesses:
T. F. BOURNE,
RALPH H. RAPHAEL.